(12) United States Patent
Smith

(10) Patent No.: US 7,096,683 B2
(45) Date of Patent: Aug. 29, 2006

(54) VEHICLE COOLING SYSTEM

(75) Inventor: Mark G. Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 10/605,181

(22) Filed: Sep. 12, 2003

(65) Prior Publication Data

US 2005/0056035 A1    Mar. 17, 2005

(51) Int. Cl.
  *F25B 39/00*    (2006.01)
(52) U.S. Cl. .................... 62/200; 62/228.3; 62/243
(58) Field of Classification Search .................. 62/199, 62/200, 228.3, 184, 503, 180, 229, 203, 204, 62/205, 244, 239, 243
See application file for complete search history.

(56) References Cited

U.S. PATENT DOCUMENTS

| 4,306,000 | A |   | 12/1981 | Kodali |
|---|---|---|---|---|
| 4,389,855 | A | * | 6/1983 | Ueda et al. .................... 62/200 |
| 5,077,982 | A | * | 1/1992 | Shaffer, Jr. .................... 62/199 |
| 5,289,692 | A | * | 3/1994 | Campbell et al. ............. 62/184 |
| 5,385,035 | A |   | 1/1995 | Nishida et al. |
| 5,910,159 | A | * | 6/1999 | Matsuo et al. ................ 62/199 |
| 6,016,662 | A | * | 1/2000 | Tanaka et al. ................ 62/199 |
| 6,138,466 | A |   | 10/2000 | Lake et al. |
| 6,266,967 | B1 | * | 7/2001 | Honda ........................ 62/200 |
| 6,357,541 | B1 |   | 3/2002 | Matsuda et al. |
| 6,394,210 | B1 |   | 5/2002 | Matsuda et al. |
| 6,422,027 | B1 |   | 7/2002 | Coates, Jr. et al. |
| 6,467,286 | B1 |   | 10/2002 | Hasebe et al. |
| 6,481,230 | B1 |   | 11/2002 | Kimishima et al. |

* cited by examiner

*Primary Examiner*—Harry B. Tanner
(74) *Attorney, Agent, or Firm*—David B. Kelley; Brooks & Kushman

(57) ABSTRACT

An integrated cooling system having two separate evaporator coils is provided. Each evaporator coil has its own shutoff, thereby allowing for individual control over the cooling of each of two vehicle spaces. The evaporator coils may be disposed within the vehicle to cool the passenger compartment and a battery compartment, respectively. The separate control afforded by the cooling system provides the flexibility of shutting off cooling to the vehicle passenger compartment for the comfort of the vehicle occupants, while still providing cooling to the battery, as needed. The cooling system includes a number of control features which provide for automatically shutting off cooling to one or more of the evaporator coils based on parameters such as air temperature and refrigerant pressure.

15 Claims, 4 Drawing Sheets

VEHICLE COOLING SYSTEM

BACKGROUND OF INVENTION

1. Field of the Invention

The present invention relates to a vehicle cooling system, and more particularly, a system for separately cooling more than one vehicle space.

2. Background Art

There are a variety of vehicles today which utilize electricity, and in particular an electric motor, to at least assist in powering the vehicle. For example, there are electric vehicles, which are powered exclusively by an electric motor; hybrid electric vehicles (HEV), which may be selectively powered by an internal combustion engine or an electric motor; and fuel cell vehicles, or hybrid fuel cell vehicles, just to name a few. The electric motor used in such vehicles may have an electrical power source such as a fuel cell or a battery.

In the case of a battery used to provide power to an electric motor to drive a vehicle, the temperature of the battery can increase significantly when the motor is used for extended periods of time. The increase in battery temperature may be compounded when the battery is confined to a relatively small, enclosed space. If the increase in battery temperature is left unchecked, the battery life may be reduced. Thus, it is desirable to provide a system for cooling a battery, or batteries, in a vehicle to keep the battery temperature low enough that the battery life is not reduced.

In addition to the added requirement of keeping the battery cool in a hybrid electric vehicle, there is also a need to provide a cooling system for the vehicle passenger compartment, just as in a conventional vehicle. Although separate systems may be used to provide cool air to the battery and the vehicle passenger compartment, an integrated, or at least partially integrated, cooling system can be used. One attempt to provide an integrated cooling system for both a battery and a vehicle passenger compartment, is described in U.S. Pat. No. 6,138,466 issued to Lake et al. on Oct. 31, 2000.

Lake et al. discusses the use of a cooling system having an inside heat exchanger for adjusting the temperature of air flowing into the passenger compartment, and a zone-control heat exchanger which may be used for cooling a battery assembly. Lake et al. does not describe a mechanism for detecting the temperature of the air at each heat exchanger, and automatically stopping the flow of cooling fluid to a heat exchanger when the detected temperature falls below a predetermined temperature. Lake et al. does describe disabling operation of the inside heat exchanger when the ambient air temperature outside the vehicle is low, but this does not account for local temperatures near the heat exchanger, nor does it protect the zone-control heat exchanger from icing. In addition, Lake et al. does not describe a mechanism for providing fresh air directly across the battery. This may lead to unnecessary energy consumption, when the temperature of the ambient air outside the vehicle is low enough to cool the battery without the use of a heat exchanger.

Thus, a need still exists for a vehicle cooling system that at least partially integrates passenger compartment cooling and vehicle battery cooling, and includes a mechanism for automatically shutting off the flow of coolant to an individual heat exchanger when the temperature of that heat exchanger becomes too low, thereby helping to prevent icing on the heat exchanger. In addition, there exists a need for a vehicle cooling system that at least partially integrates passenger compartment cooling and vehicle battery cooling, and provides a fresh air intake directly connected to the vehicle battery, so that at least a portion of the vehicle cooling system can be shut down when the temperature of the ambient air outside the vehicle is low enough to adequately cool the battery without the use of the cooling system.

SUMMARY OF INVENTION

Therefore, a cooling system for a vehicle having first and second spaces to be cooled is provided. The cooling system includes first and second heat exchangers for respectively cooling air flowing into the first and second vehicle spaces. A conduit system is in communication with the first and second heat exchangers, and is configured to provide a fluid flow path to and from the heat exchangers. A pump is selectively operable for moving fluid through the conduit system, and first and second valves are in communication with the conduit system. A first sensor is configured to measure a first temperature, and to output a signal related to the first temperature. The first temperature is indicative of the temperature of air exiting the first heat exchanger. A second sensor is configured to measure a second temperature, and to output a signal related to the second temperature. The second temperature is indicative of the temperature of air exiting the second heat exchanger. A controller is in communication with the first and second sensors, and with at least one of the pump and the first and second valves. The controller is configured to effect a stoppage of fluid flow to the first heat exchanger when the first temperature is below a predetermined temperature. The controller is also configured to effect a stoppage of fluid flow to the second heat exchanger when the second temperature is below the predetermined temperature.

The invention also provides a cooling system as described above, further including a duct system having at least a portion of the second heat exchanger disposed therein. The duct system is configured to selectively provide fluid communication between a battery and an ambient environment outside the vehicle.

The invention further provides a cooling system for a vehicle having first and second spaces to be cooled. The cooling system includes first and second heat exchangers for respectively cooling air flowing into the first and second vehicle spaces. A conduit system is in communication with the first and second heat exchangers, and is configured to provide a fluid flow path to and from the heat exchangers. A pump is selectively operable for moving fluid through the conduit system; the pump includes an inlet and an outlet. First and second valves are in communication with the conduit system. A switch is disposed between one of the heat exchangers and the pump inlet. The switch is configured to determine a fluid pressure in the conduit system, and to effect shutdown of the pump when the determined fluid pressure is below a predetermined pressure.

The invention also provides a vehicle having a passenger compartment and a battery. The vehicle includes a cooling system having first and second heat exchangers. The first heat exchanger is disposed in relation to the passenger compartment for selectively cooling air flowing into the passenger compartment. The second heat exchanger is disposed in relation to the battery for selectively cooling air flowing across the battery. A conduit system is in communication with the first and second heat exchangers, and is configured to provide a fluid flow path to and from the heat exchangers. First and second valves communicate with the conduit system. The first valve is configured to selectively inhibit fluid flow to the first heat exchanger. The second valve is configured to selectively inhibit fluid flow to the second heat exchanger. The cooling system also has first and second sensors. The first sensor is configured to measure a first temperature indicative of the temperature of air exiting of the first heat exchanger; the first sensor is also configured to output a signal related to the first temperature. The second sensor is configured to measure a second temperature indicative of the temperature of air exiting the second heat exchanger, and is further configured to output a signal related to the second temperature. A controller is in communication with the first and second sensors, and at least one of the pump and the first and second valves. The controller is configured to effect a stoppage of fluid to the first heat exchanger when the first temperature is below a predetermined temperature. The controller is further configured to effect a stoppage of fluid flow to the second heat exchanger when the second temperature is below the predetermined temperature.

DETAILED DESCRIPTION

Figure 1:
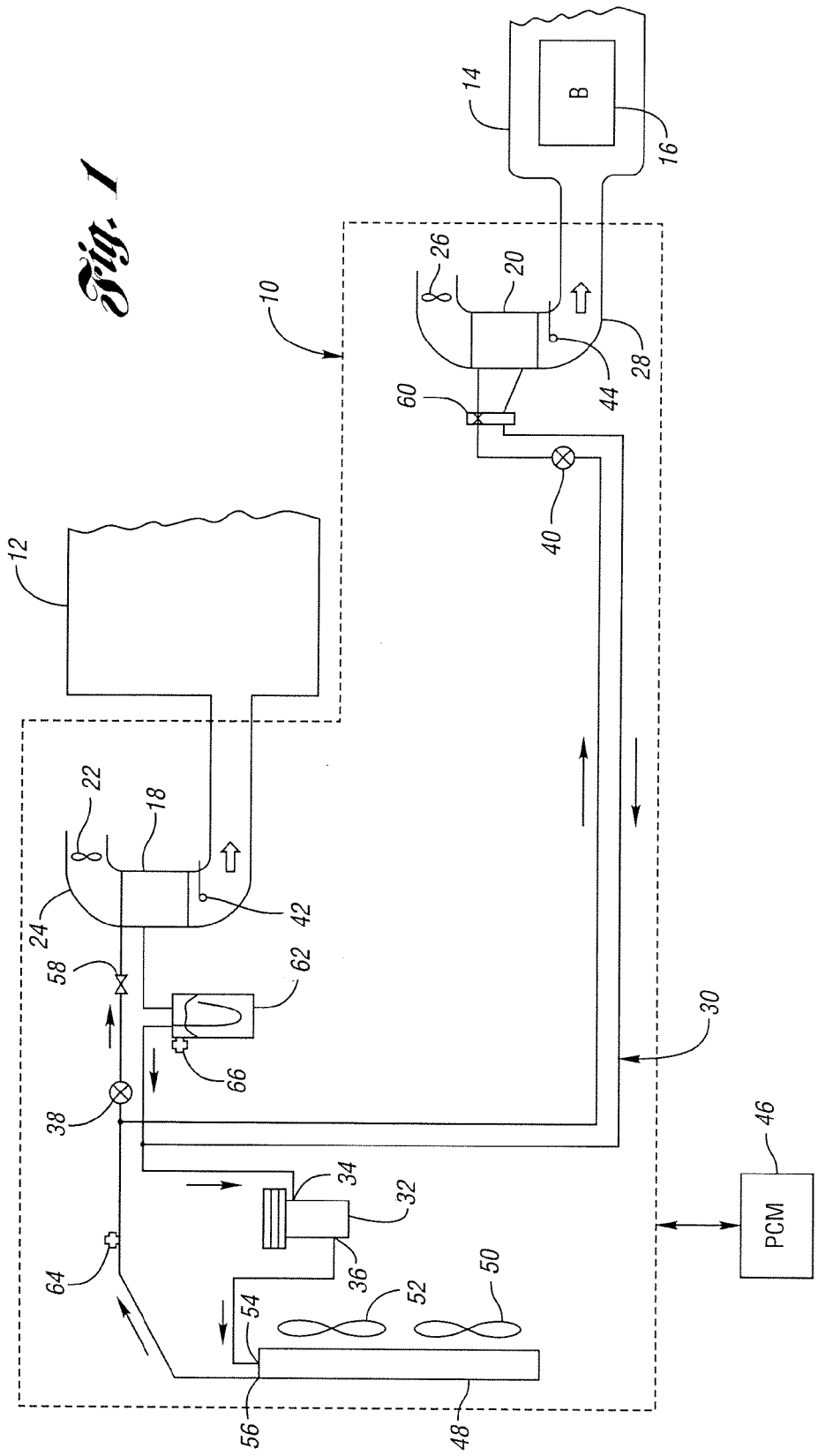
FIG. 1 is a schematic representation of a cooling system in accordance with the present invention.

FIG. 1 shows a cooling system 10 for a vehicle having a first space to be cooled, such as a passenger compartment 12, and a second space to be cooled, such as a battery compartment 14. Inside the battery compartment 14 is a traction battery 16 used to power a motor (not shown) used to propel the vehicle. Of course, a cooling system, such as the cooling system 10, can be used to cool vehicle spaces other than a passenger compartment and a battery compartment.

The cooling system 10 includes a first heat exchanger, or front evaporator coil 18, which is disposed in relation to the passenger compartment 12 for selectively cooling the air flowing into the passenger compartment 12. The cooling system 10 also includes a second heat exchanger, or rear evaporator coil 20. The rear evaporator coil 20 is disposed in relation to the battery compartment 14 for selectively cooling the air flowing into the battery compartment 14 and across the battery 16. A first fan 22 cooperates with a front duct system 24 for moving air through the front evaporator coil 18 and into the passenger compartment 12. A second fan 26 cooperates with a rear duct system 28 for moving air through the rear evaporator coil 20, into the battery compartment 14, and across the battery 16. As seen in FIG. 1, the rear evaporator coil 20 is disposed within the rear duct system 28.

A conduit system 30 is in communication with the front and rear evaporator coils 18, 20, and is configured to provide a fluid flow path to and from the evaporator coils 18, 20. In particular, a pump, or compressor 32, is selectively operable to move a fluid such as a refrigerant through the conduit system 30. The compressor 32 includes an inlet 34 and an outlet 36.

A first valve 38 communicates with the conduit system 30, and is configured to selectively inhibit the flow of refrigerant through the front evaporator coil 18. Similarly, a second valve 40 communicates with the conduit system 30, and is configured to selectively inhibit the flow of refrigerant to the rear evaporator coil 20. Because separate valves 38, 40 are used to control the flow of refrigerant to the front and rear evaporator coils 18, 20, the cooling system 10 can be used to provide cooling to a single vehicle space. That is, if cooling is desired in the passenger compartment only, the second valve 40 can be closed such that refrigerant does not flow through the rear evaporator coil 20. Similarly, if the battery 16 needs to be cooled, but the passenger compartment 12 does not, the first valve 38 can be closed, such that refrigerant flows through only the rear evaporator coil 20.

Providing separate valves 38, 40 for the front and rear evaporator coils 18, 20 provides an improvement over vehicle cooling systems that do not have separate shutoff valves for each evaporator coil. Without a separate shutoff valve for each evaporator coil, refrigerant will flow through both evaporator coils even if only one of the two vehicle spaces is calling for cooling. This may lead to undesirably cool air flowing into the vehicle space that did not request cooling.

Figure 2:
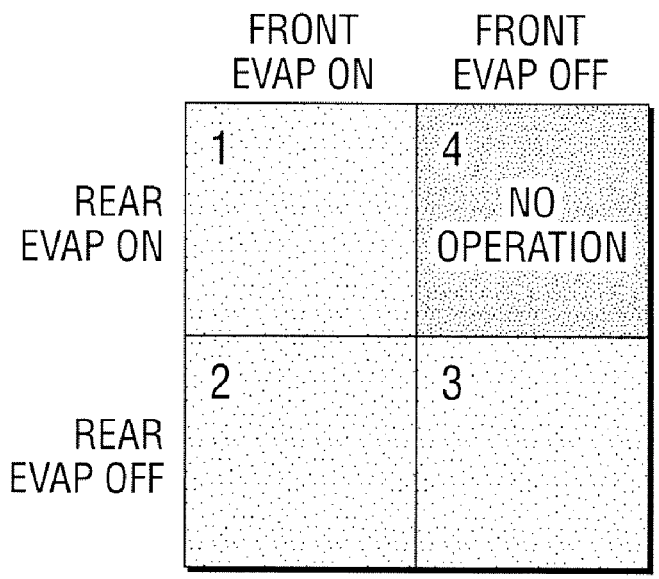
FIG. 2 is a graphical illustration of the zones of operation of a cooling system that does not have a separate shutoff valve for each of two evaporator coils.
Figure 3:
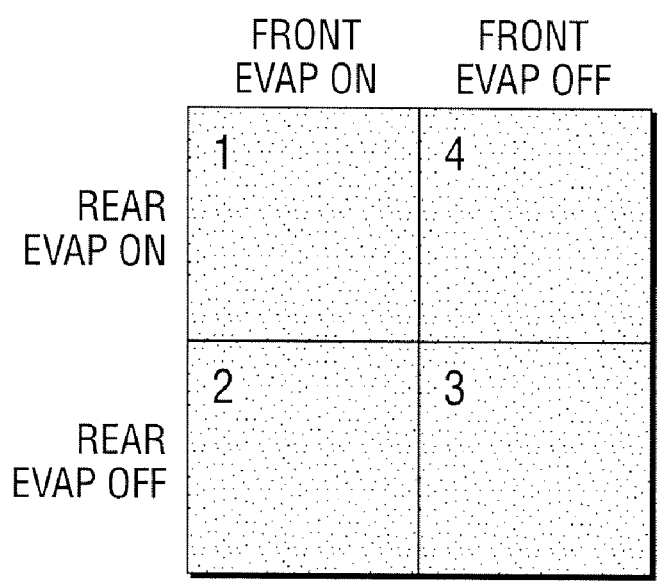
FIG. 3 is a graphical illustration of the zones of operation of a cooling system in accordance with the present invention.

FIGS. 2 and 3 graphically illustrate an advantage of having separate shutoff valves, such as the valves 38, 40 in the cooling system 10. When separate evaporator coils are used in a single cooling system, there are four possible zones of operation: 1) both the front and rear evaporator coils are on; 2) the front evaporator coil is on, but the rear evaporator coil is off; 3) both the front and rear evaporator coils are off; and 4) the front evaporator coil is off, but the rear evaporator coil is on.

FIG. 2 illustrates the situation found in vehicles having a cooling system with front and rear evaporator coils which respectively cool front and rear portions of a large passenger compartment. In such a system, where a separate shutoff valve is not provided for the front evaporator coil, priority is given to the front passengers. In zones 1 and 3, the front and rear passengers are presumably in agreement, since both evaporator coils are either on or off. In zones 2 and 4, however, the rear passengers have different demands.

For example, FIG. 2 shows that the rear evaporator coil is off in zone 2; nonetheless, refrigerant will continue to flow through the coil because the front evaporator coil is calling for cooling. Thus, the rear passengers may experience undesirably cool air which results from the lack of a separate shutoff valve to stop the flow of refrigerant to the rear evaporator coil. Similarly, in zone 4 the front evaporator coil is off, which stops the flow of refrigerant through the entire system. Therefore, even though the rear evaporator coil is on, and the rear passengers may desire cool air, no refrigerant flows through the rear evaporator coil. This is not the case for a cooling system, such as the cooling system 10, which is operational in all four zones, since each evaporator coil has its own shutoff valve—see FIG. 3. Thus, the battery compartment 14 can continued to receive cool air even when the passenger compartment 12 does not.

Returning to FIG. 1, it is seen that the cooling system 10 includes a first sensor, or thermistor 42, which is configured to measure the temperature of the air exiting the front evaporator coil 18, and to output a signal related to the measured temperature. A second sensor, or thermistor 44, is configured to measure the temperature of the air exiting the rear evaporator coil 20, and to output a signal related to the measured temperature. A controller, or powertrain control module (PCM) 46, is in communication with various components of the cooling system 10. For example, the PCM 46 is capable of controlling the compressor 32 to start and stop the flow of refrigerant through the conduit system 30.

The compressor 32 includes an on/off clutch for starting and stopping the flow of refrigerant through the conduit system 30. Of course, other types of compressors may be used, for example, a variable displacement compressor without a clutch. Such a compressor would control the flow of fluid through the conduit system 30 by modulating the displacement of the compressor, as needed. Alternatively, a high voltage, integrated electric motor driven compressor could be used.

The PCM 46 is in communication with the thermistors 42, 44 to receive signals related to their respective measured air temperatures. The PCM 46 also communicates with the valves 38, 40, such that the PCM 46 can effect a stoppage of refrigerant flow to either evaporator coil 18, 20 by closing the appropriate valve 38, 40. Although the PCM 46 is shown in FIG. 1 as a single controller communicating directly with various elements of the cooling system 10, other controller configurations may also be used. For example, individual elements of the cooling system 10 such as the compressor 32 and the valves 38, 40 may have individual controllers, each of which would then be connected to a central controller, such as the PCM 46.

The cooling system 10 also includes a third heat exchanger, or condenser 48, which communicates with the conduit system 30, and is disposed between the pump outlet 36 and the front and rear evaporator coils 18, 20. The condenser 48 receives hot, high-pressure vapor refrigerant from the compressor 32. Fans 50, 52 move air across the condenser 48 to cool and condense the refrigerant as it moves from condenser inlet 54 to condenser outlet 56.

The cooling system 10 also includes a first throttling device, or orifice tube 58, and a second throttling device, or thermal expansion valve (TXV) 60. The orifice tube 58 and the TXV 60 each communicate with the conduit system 30, and are configured to effect a reduction in pressure of the refrigerant before it reaches the front and rear evaporator coils 18, 20, respectively. A cooling system, such as the cooling system 10, may have a different configuration of throttling devices—e.g., two orifice tubes or two TXVs.

A number of considerations may be important when choosing the type of throttling device to use with a cooling system, such as the cooling system 10. For example, a TXV may be more expensive than an orifice tube; however, use of an orifice tube may require a reservoir, such as an accumulator 62, which requires additional space. The accumulator 62 communicates with the conduit system 30, and is configured to temporarily store at least some of the refrigerant flowing in the conduit system 30. The accumulator 32 separates the liquid refrigerant from the liquid and vapor mixture exiting the front evaporator coil 18. This helps to ensure that most of the refrigerant reaches the compressor 32 in a gaseous state. The compressor 32 also receives a small amount of liquid from the bottom of the accumulator 62; this liquid lubricates the compressor 32.

The cooling system 10 also includes two switches 64, 66, each of which is in communication with the PCM 46. As described below, the switches are pressure sensitive devices. Of course, a cooling system, such as the cooling system 10, may employ other types of pressure sensitive devices, such as pressure transducers. The first switch 64 is disposed between the compressor outlet 36 and the orifice tube 58. Thus, it may be referred to as a high pressure switch. Conversely, the switch 66 is disposed between the front evaporator coil 18 and the compressor inlet 34, and thus, may be referred to as a low pressure switch.

The high pressure switch 64 is configured to determine the pressure of the refrigerant in a conduit system 30, and to effect shutdown of the compressor 32 when the refrigerant pressure gets above a predetermined pressure. This helps to ensure that the pressure of the refrigerant in a conduit system 30 will never get high enough to damage any of the components of the cooling system 10, or to vent refrigerant into the atmosphere. The compressor outlet 36 includes a pressure relief valve (not shown) that allows refrigerant to be released when the pressure reaches a predetermined level.

The high pressure switch 64 performs a second function, and thus, may be referred to as a dual function switch. In addition to effecting a shutdown of the compressor 32 when the refrigerant pressure gets too high, the high pressure switch 64 also signals the PCM 46 to operate the fans 50, 52. This provides a mechanism to reduce the refrigerant pressure prior to the pressure reaching the level where the compressor 32 is shut down. When the switch 64 detects that the refrigerant pressure needs to be reduced, it will signal the PCM 46 to start the fans 50, 52 if they are off, and to increase their speed if they are already running. This provides additional cooling for the refrigerant as it flows through the third heat exchanger 48, which may effect a pressure reduction so that a shutdown of the compressor 32 is not required.

Similarly, the low pressure switch 66 is configured to determine the pressure of the refrigerant in the conduit system 30 and to effect a shut down of the compressor 32 when the refrigerant pressure is below a predetermined pressure. This helps to ensure that enough refrigerant is flowing into the compressor 32 to cool and lubricate the internal mechanisms of the compressor 32. The switches 64, 66 are connected to the compressor 32 such that they directly effect shutdown of the compressor 32 when the pressure of the refrigerant and the conduit system 32 gets too high or too low. Alternatively, switches, such as the switches 64, 66, can be configured to communicate with the PCM 46. In such an embodiment the switches 64, 66 would signal the PCM 46 when the refrigerant pressure is too high or too low, and the PCM 46 would effect a shutdown of the compressor 32.

As discussed above, the thermistors 42, 44 communicate with the PCM 46, and are configured to provide signals to the PCM 46 indicative of the air temperature exiting the front and rear evaporator coils 18, 20, respectively. The PCM 46 is configured to effect a stoppage of refrigerant flow to the front evaporator coil 18 when the first temperature, as measured by the thermistor 42, is below a predetermined temperature. Similarly, the PCM 46 is configured to effect a stoppage of refrigerant flow to the rear evaporator coil 20 when the second temperature, as measured by the thermistor 44, is below the predetermined temperature. This helps to prevent damage to the evaporator coils 18, 20, and helps to ensure that they do not get so cold that ice forms on the coils, thereby reducing the efficiency of the cooling system 10.

Similarly, the PCM 46 is configured to effect a stoppage of refrigerant flow to either evaporator coil 18, 20 when the cooling of the respective vehicle space is not required. The PCM 46 can effect a stoppage of refrigerant flow in a number of different ways. For example, the PCM 46 can close the valves 38, 40 individually, thereby stopping refrigerant flow to only one evaporator coil. The PCM 46 can also shutdown the compressor 32, thereby stopping refrigerant flow to both evaporator coils 18, 20. Alternatively, the PCM 46 can close either or both valves 38, 40, and simultaneously shutdown the compressor 32.

As shown in FIG. 1, the rear evaporator coil 20 can be used to provide cool air to a battery, such as the battery 16. The air flowing through either evaporator coil 18, 20 can be fresh air, or recirculated. A number of configurations can be used to provide fresh or recirculated air to a battery compartment, such as the battery compartment 14. An example of such a system is described in copending U.S. Patent Application Publication No. 2005/0056472, entitled "Cooling System For A Vehicle Battery," filed on Sep. 12, 2003, and incorporated herein by reference.

Figure 4:
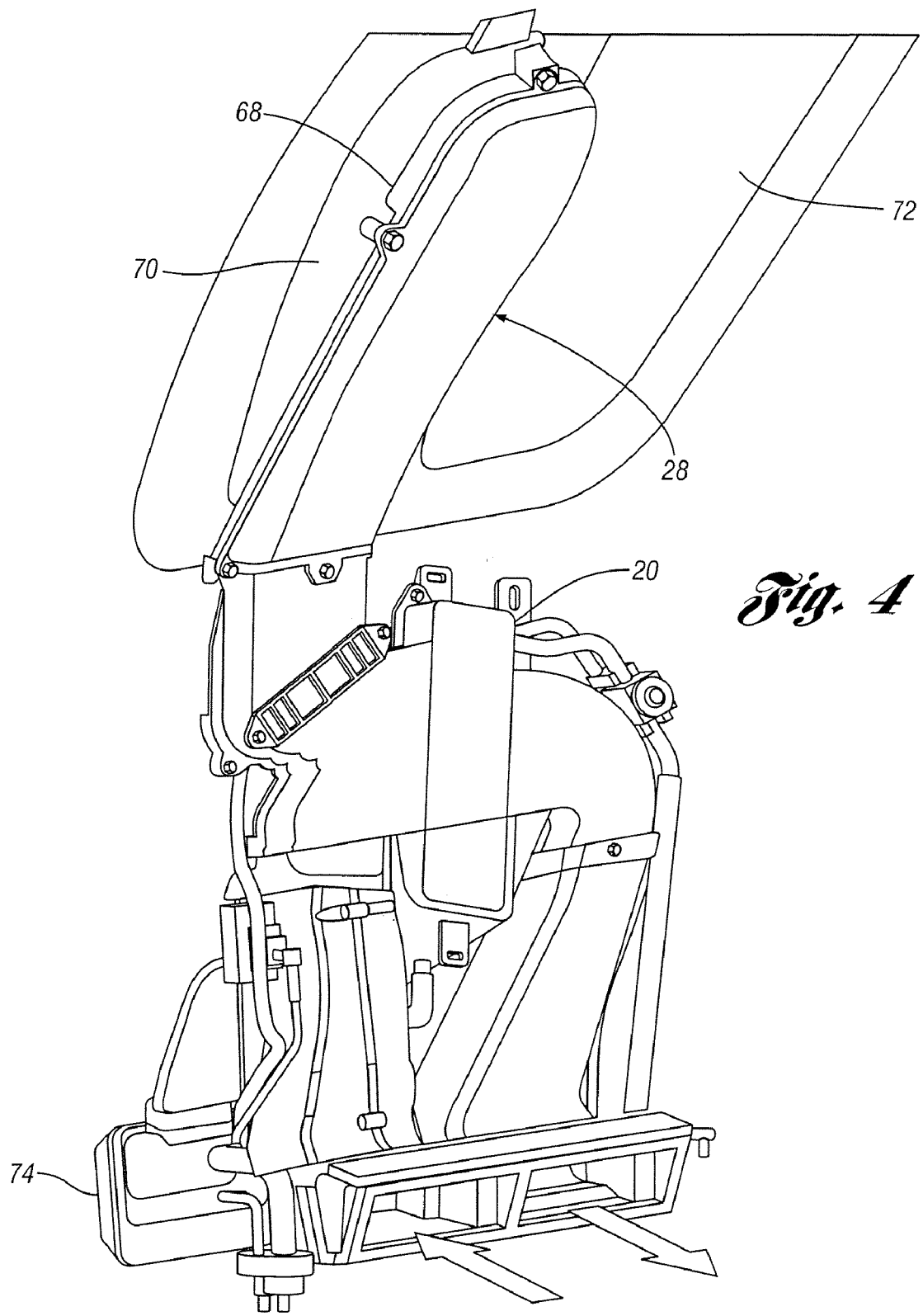
FIG. 4 is a partial fragmentary perspective view of a portion of the cooling system shown in FIG. 1.

FIG. 4 shows one configuration of how the evaporator coil 20 can be used to provide air to cool the battery 16. As seen in FIG. 4, the rear evaporator coil 20 is disposed within the rear duct system 28. The rear duct system 28 includes an air intake 68 which communicates with a vehicle air intake 70. The vehicle air intake 70 is attached to a rear quarter window 72 to provide an inlet for ambient air from outside the vehicle into the duct system 28. Having a fresh air intake for a battery cooling system, particularly one that is located high-up on a vehicle, may have a number of benefits. Such an air intake is described in U.S. Patent Application Publication No. 2005/0059338, entitled "Fresh Air Intake For A Vehicle," filed on Sept. 12, 2003, and incorporated herein by reference. As seen in FIG. 4, the duct system 28 provides an air flow path from outside the vehicle through the evaporator coil 20 to the battery 16, as indicated by the direction arrow. The duct system 28 also provides an air flow path back from the battery 16, such that the air may be recirculated through the evaporator coil 20, or exhausted outside the vehicle through an air extractor 74.

Figure 5:
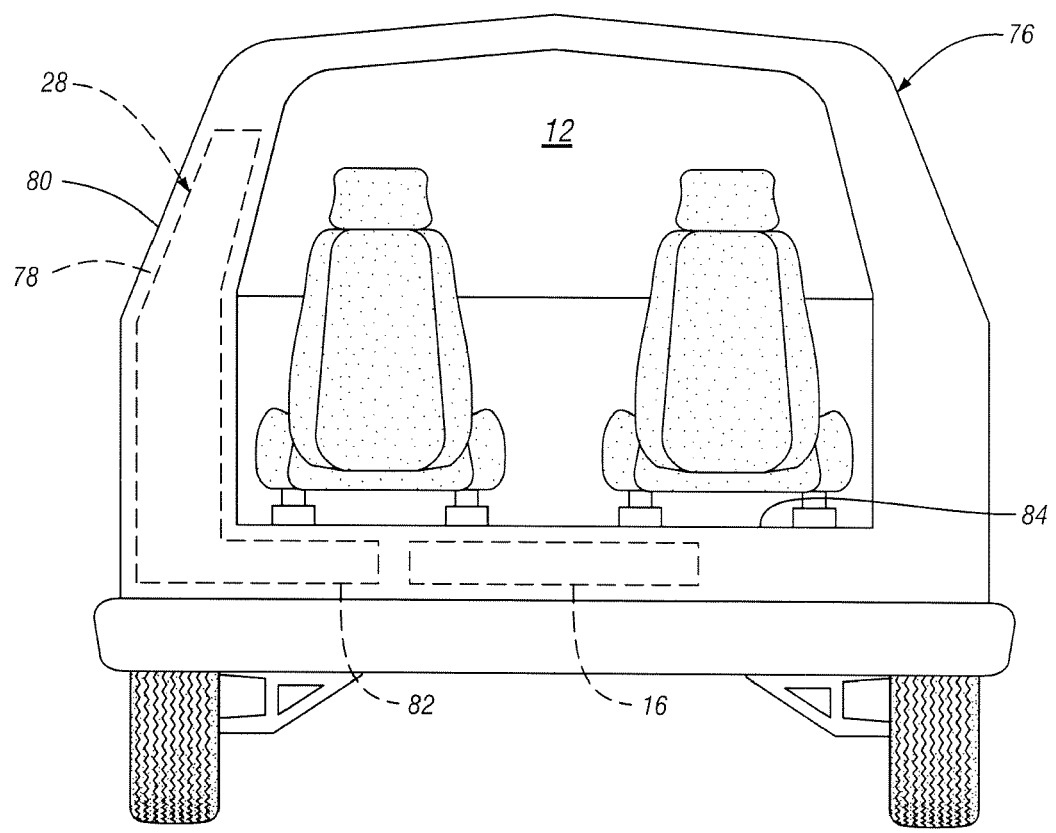
FIG. 5 is a perspective view of a portion of a vehicle and a portion of the cooling system shown in FIG. 1.

As seen in FIG. 5, the configuration of the rear evaporator coil 20 and the rear duct system 28 may be conveniently located in a vehicle 76 so as to minimize the amount of space taken from the passenger compartment 12. For example, a first portion 78 of the rear duct system 28 may be disposed along one side 80 of the vehicle 76. A second portion 82 of the rear duct system 28 may be disposed beneath a load floor 84 so as to come into close proximity to the battery 16, while not taking up space in the vehicle passenger compartment 12.

While the best mode for carrying out the invention has been described in detail, those familiar with the art to which this invention relates will recognize various alternative designs and embodiments for practicing the invention as defined by the following claims.

The invention claimed is:

1. A cooling system for a vehicle having first and second spaces to be cooled, the cooling system including first and second heat exchangers for respectively cooling air flowing into the first and second vehicle spaces, and a conduit system in communication with the first and second heat exchangers and configured to provide a fluid flow path to and from the heat exchangers, the cooling system further including a pump selectively operable for moving fluid through the conduit system, and first and second valves in communication with the conduit system, the cooling system comprising:

a first sensor configured to measure a first temperature, and to output a signal related to the first temperature, the first temperature being indicative of the temperature of air exiting the first heat exchanger;

a second sensor configured to measure a second temperature, and to output a signal related to the second temperature, the second temperature being indicative of the temperature of air exiting the second heat exchanger; and a controller in communication with the first and second sensors, and with at least one of the pump and the first and second valves, the controller being configured to effect a stoppage of fluid flow to the first heat exchanger when the first temperature is below a predetermined temperature, and to effect a stoppage of fluid flow to the second heat exchanger when the second temperature is below the predetermined temperature, and wherein the first vehicle space is a passenger compartment, and the second vehicle space is a battery compartment.

2. The cooling system of claim 1, wherein the controller is configured to effect a stoppage of fluid flow to the first and second heat exchangers by stopping operation of the pump.

3. The cooling system of claim 1, wherein the controller is in communication with the first and second valves, and wherein the controller is configured to effect a stoppage of fluid flow to the first heat exchanger by closing the first valve, and to effect a stoppage of fluid flow to the second heat exchanger by closing the second valve.

4. The cooling system of claim 1, further comprising a reservoir communicating with the conduit system, and configured to temporarily store at least some fluid flowing in the conduit system, and to facilitate separation of liquid and vapor in the stored fluid.

5. The cooling system of claim 1, wherein the pump includes one of a compressor having a clutch, a variable displacement compressor, and a high-voltage, integrated electric motor driven compressor.

6. The cooling system of claim 1, further comprising a third heat exchanger communicating with the conduit system and disposed between the pump outlet and the first and second heat exchangers, the third heat exchanger being configured to cool fluid flowing in the conduit system.

7. The cooling system of claim 6, further comprising first and second throttling devices, each of the throttling devices communicating with the conduit system, and configured to effect a reduction in pressure of fluid flowing through the conduit system, the first throttling device being disposed between the first valve and the first heat exchanger, the second throttling device being disposed between the second valve and the second heat exchanger.

8. The cooling system of claim 7, the pump including an inlet and an outlet, the cooling system further comprising a pressure sensitive device disposed between the pump outlet and one of the throttling devices, the pressure sensitive device being configured to determine a fluid pressure in the conduit system, and to effect shutdown of the pump when the determined fluid pressure is above a predetermined pressure.

9. The cooling system of claim 8, further comprising at least one fan disposed in relation to the third heat exchanger for moving air through the third heat exchanger, and wherein the pressure sensitive device is further configured to effect selective operation of the fan in response to the determined fluid pressure in the conduit system.

10. The cooling system of claim 1, the vehicle having a battery disposed within the battery compartment, the cooling system further comprising a duct system having at least a portion of the second heat exchanger disposed therein, the duct system being configured to selectively provide fluid communication between the battery and an ambient environment outside the vehicle.

11. The cooling system of claim 10, further comprising a fan cooperating with the duct system for moving air through at least a portion of the duct system and across the battery.

12. A vehicle having a passenger compartment and a battery, the vehicle comprising:
a cooling system including,
a) first and second heat exchangers, the first heat exchanger being disposed in relation to the passenger compartment for selectively cooling air flowing into the passenger compartment, the second heat exchanger being disposed in relation to the battery for selectively cooling air flowing across the battery,
b) a conduit system in communication with the first and second heat exchangers, and configured to provide a fluid flow path to and from the heat exchangers,
c) a pump selectively operable for moving fluid through the conduit system,
d) first and second valves, each of the valves communicating with the conduit system, the first valve being configured to selectively inhibit fluid flow to the first heat exchanger, the second valve being configured to selectively inhibit fluid flow to the second heat exchanger,
e) first and second sensors, the first sensor being configured to measure a first temperature indicative of the temperature of air exiting the first heat exchanger, and further configured to output a signal related to the first temperature, the second sensor being configured to measure a second temperature indicative of the temperature of air exiting the second heat exchanger, and further configured to output a signal related to the second temperature, and
f) a controller in communication with the first and second sensors and at least one of the pump and the first and second valves, the controller being configured to effect a stoppage of fluid flow to the first heat exchanger when the first temperature is below a predetermined temperature, and to effect a stoppage of fluid flow to the second heat exchanger when the second temperature is below the predetermined temperature.

13. The vehicle of claim 12, wherein the controller is configured to effect a stoppage of fluid flow to the first and second heat exchangers by stopping operation of the pump.

14. The vehicle of claim 12, wherein the controller is configured to effect a stoppage of fluid flow to the first heat exchanger by closing the first valve, and to effect a stoppage of fluid flow to the second heat exchanger by closing the second valve.

15. The vehicle of claim 12, wherein the cooling system further comprises a duct system having at least a portion of the second heat exchanger disposed therein, the duct system being configured to selectively provide fluid communication between the battery and an ambient environment outside the vehicle.

* * * * *